Nov. 18, 1924.                                              1,515,701
                      H. T. REEVE
                     EYE PROTECTOR
                   Filed Oct. 12, 1917
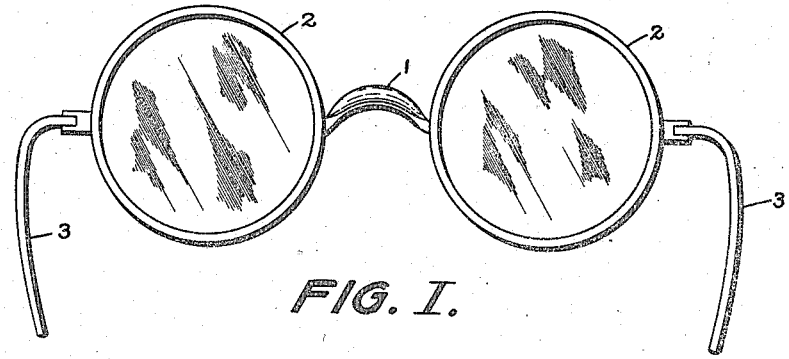
FIG. I.
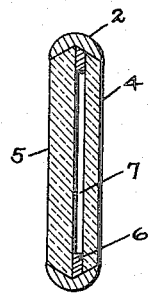
FIG. II.
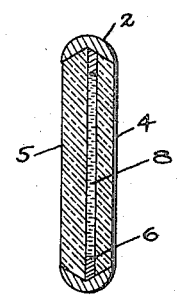
FIG. III.
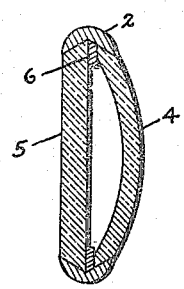
FIG. IV.
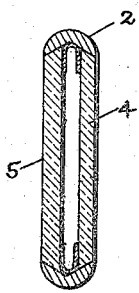
FIG. V.
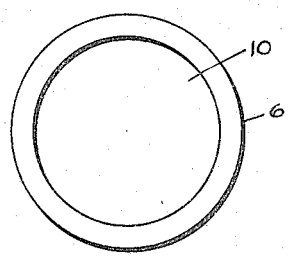
FIG. VI.
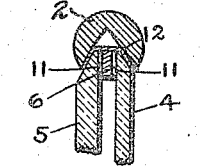
FIG. VII.
INVENTOR
HOWARD T. REEVE
BY
H. H. Styll, H. K. Parsons
ATTORNEYS Patented Nov. 18, 1924.

1,515,701

UNITED STATES PATENT OFFICE.

HOWARD T. REEVE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE PROTECTOR.

Application filed October 12, 1917. Serial No. 196,119.

*To all whom it may concern:*

Be it known that I, HOWARD T. REEVE, a subject of Great Britain, residing at Southbridge, in the county of Worcester and State of Massachusetts, have invented certain new and useful Improvements in Eye Protectors, of which the following is a specification.

This invention relates to improvements in eye protectors and has particular reference to an improved construction of this character particularly adapted for use in the industries to protect the eyes of the wearer from flying particles or the like.

The principal object of the present invention is the provision of an improved transparent vision member adapted to be mounted in a desired frame or support, which member while being clear, transparent and free from injurious effects as respects the vision of the wearer, will be so constructed as to afford maximum resistance to the blow of a flying particle thereagainst, and will eliminate to the greatest possible degree liability of either the particle or chips from the transparent protecting member being driven into the eye of the wearer.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a protector embodying my improvement.

Figure II represents a vertical sectional view of one form thereof.

Figure III represents a similar view of another form.

Figure IV represents a similar view of a form employing a coquille or meniscus outer member.

Figure V is a sectional view illustrating the use of a slightly different form of spacing member.

Figure VI represents a plan view of one of my buffer rings.

Figure VII represents an enlarged detailed sectional view of the attachment of the spacing member illustrating the exact relationship of the several parts.

In the drawings, in which similar characters of reference are employed to denote corresponding parts throughout the several views, the numeral 1 designates the bridge of an eye protector bearing at its ends the frames 2 adapted to be held in position as by the temples 3 and to receive my improved protecting lenses.

In Figure II, I have illustrated the simplest form of my improved invention, in which it is shown as consisting of the thin front plate or glass disc 4, the heavier rearwardly disposed disc 5, and an interposed resilient buffer ring 6. This ring, it will be understood, may be formed of any desired substance, but preferably of a substance having inherent resiliency so as to allow of a slight yielding movement of the disc or lens 4 upon a blow thereagainst and to a certain extent take up the shock of the blow. Among other materials contemplated as usable in connection with the invention I might suggest the use of rubber, felt, celluloid, or the like.

By reference to Figure II it will be seen that the complete lens comprising the members 4 and 5 and the interposed buffer or shock absorber and spacing member 6 are mounted and retained within the frame 2, while when a flying particle strikes against the glass 4 with sufficient shock to shatter an ordinary lens the initial shock will exert its force partially against the lens on account of the inertia of the lens and partially against the member 6 as the lens yields thereagainst, while in the event that the force of the blow is sufficient to shatter the member 4 the force will be largely taken up in the shattering and rearward driving of particles of the lens 4 on account of its partial yielding movement due to the presence of the buffer 6, while there will be disposed behind the lens 4 and spaced therefrom the heavy lens member 5, against which the particles 4 or the object itself, if of sufficient velocity, will strike. This lens, however, will preferably be of especially tempered or practically unbreakable glass, and in view of the minimizing of the blow through the member 4 and the spacing buffer 6 will resist almost any ordinary shock, or if not entirely resisting it will probably only be cracked and not driven into the eye of the wearer, while the time necessary for the particle to pass through the member 4 and space 7 will permit the wearer to close the lid of the eye and prevent any matter forced through the lens 5 from striking the eye ball and only become embedded in the lid.

I wish to call particular attention to the provision of this slight space 7 between the members 4 and 5, since I realize that in the past certain attempts have been made to produce a satisfactory non-breakable lens, employing two separated discs with a layer of celluloid or other transparent material cemented therebetween. I have found, however, by experimentation with lenses of this character that while they will to a very great degree resist piercing by particles striking thereagainst that on account of the glass and intimate contact between the several parts the force of a blow striking against the lens on the one side will cause vibrations through the structure sufficient to throw off chips or splinters from the lens on the opposite side and thus renders this less dangerous to the user from the chips thrown off by the under lens through the contact of the parts at the point receiving the blow and consequent vibratory transmission of the force even though the blow is insufficient to pierce or entirely shatter the entire structure. With my improved construction on the other hand due to the yielding mounting of the front lens and the space between the two lenses there is no direct transmitted force so that initial force is taken up by the first lens and only the particles of this lens pass across the space 7 and contact with the member 5 tending if at all to crack or break this lens but not to throw off chips from the rear face of it.

In Figure III, I have illustrated a further slight modification of my invention, in which the space 7 in place of being empty is filled with a suitable transparent liquid or jelly like substance 8 which will have further shock absorbing properties to yield to a blow and tend to take up the force of it without having sufficient body to transmit shattering vibrations.

In Figure IV, I have shown a structure similar to Figure II, with the exception that I have in this form employed a thin front member 4 of meniscus or coquille shape, curving outwardly and thus presenting an arch to better resist blows thereagainst and retard the flying particle.

It will be noted that in Figure IV the lens 4 is shown as of concavo convex form, the rear or concave face being ground off to a substantially flat or plain surface to properly fit against the spacing member or ring 6 in the same manner as in the other figures of the drawings, while the opposite or convex face is bevelled off to properly fit a frame or other retaining member 2.

Figure VI shows the ring in detail and is intended to bring out the fact that the ring is disposed at the edge only of the lenses, leaving vision through the central aperture 10 thereof and eliminating any solid connection between the two lenses which could transmit undesirable vibrations. To secure most desirable visual results when the ring is employed I preferably secure it in position as by the layer of cement or other similar material 11, disposed each side thereof, and bind it around the edge with a suitable binder 12 holding the two lenses and interposed ring together in a unitary structure which may be more readily mounted or placed within a frame.

If desired to secure a more pronounced yielding effect, I may if desired make use of a celluloid or other ring of U form in cross section, as shown in Figure V, the ring having a lateral spring, tending to allow the edges to come together and thus form a very desirable shock absorber.

I claim:

1. In an eye protector, the combination with a frame having a single lens-receiving groove, of a pair of lenses having their edges received within the groove, a ring interposed between said lenses adjacent their periphery and means for uniting the lenses with the ring to form a single unitary structure.

2. In an eye protector, the combination with a frame having a single lens-receiving groove, a forward impact-receiving lens, a second eye-protecting lens disposed rearwardly of the first lens, a ring interposed between said lenses adjacent their periphery and means for uniting the lenses with the ring to form a single unitary structure.

3. In goggles, a lens structure comprising separable eye protecting and guard discs, one of which is of concavo-convex form and has a marginal portion of its concave face ground to provide a seat opposing the other disc, and a clamping ring encircling and connecting said discs.

4. A unitary protection element for use in connection with eye protectors or the like, comprising a pair of transparent discs, an annular spacing member disposed between the discs substantially outside the normal field of vision, and means encircling and embracing the edges of the discs for retaining the parts together and permitting of their insertion or removal as an entirety from a retaining frame.

5. An eye protecting device comprising a pair of transparent discs and a peripherally interposed annular resilient spacing member between the edges only of the discs, said spacing member being disposed outside the normal field of vision through the discs and insuring physical discontinuity of the discs and permitting of their relative yielding, both discs being bevelled on their outer faces to together form a V edge whereby the edges of the two discs may be grasped by a single frame groove and the entire device mounted as a unitary lens.

6. In eye protectors, a compound protection lens including two guard discs, one of which is of concavo-convex form having the marginal portion of its concave face bevelled to provide a seat opposed to the other lens member, and means for securing the parts together, substantially as and for the purpose described.

7. A compound eye protector lens comprising a pair of discs, one of which is of concavo-convex form having its convex face bevelled and its concave face flattened in the marginal zone, whereby a seat on the concave face is provided opposed to the other disc and a seat on the convex face is provided for an enclosing frame.

8. An eye protector lens including a pair of opposed discs, one of said discs being of concavo-convex form, and a spacing member marginally interposed between the discs, the concavo-convex disc having its concave side marginally flattened to properly fit and firmly seat against the spacing member, substantially as illustrated.

9. An eye protector lens including a pair of opposed discs, one of said discs being of concavo-convex form, a spacing member marginally interposed between the discs, the concavo-convex disc having its concave side marginally flattened to properly fit and firmly seat against the spacing member, both of said discs having their outer faces bevelled, and an enclosing rim engaging the bevelled outer faces and binding the parts together in a unitary structure.

In testimony whereof I have affixed my signature, in presence of two witnesses.

HOWARD T. REEVE.

Witnesses:
EDITH M. HALVORSEN,
ESTHER M. LAFLER.